United States Patent
Ahn et al.

(10) Patent No.: US 10,855,933 B2
(45) Date of Patent: Dec. 1, 2020

(54) TERMINAL AND IMAGE PROCESSING METHOD THEREOF

(71) Applicant: HYPERCONNECT, INC., Seoul (KR)

(72) Inventors: Sangil Ahn, Cheongju-si (KR); Beomjun Shin, Seoul (KR); Minsik Oh, Seoul (KR); Eunhee Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/259,401

(22) Filed: Jan. 28, 2019

(65) Prior Publication Data

US 2019/0238759 A1  Aug. 1, 2019

(30) Foreign Application Priority Data

Jan. 31, 2018  (KR) .................. 10-2018-0012389

(51) Int. Cl.
*H04N 5/262* (2006.01)
*G06T 5/00* (2006.01)
*H04N 5/232* (2006.01)
*G06F 3/0488* (2013.01)
(Continued)

(52) U.S. Cl.
CPC ....... *H04N 5/2621* (2013.01); *G06F 3/04883* (2013.01); *G06N 3/08* (2013.01); *G06T 5/00* (2013.01); *G06T 5/20* (2013.01); *H04N 5/232935* (2018.08); *G06T 2207/20008* (2013.01); *G06T 2207/20081* (2013.01); *G06T 2207/20084* (2013.01); *G06T 2207/20092* (2013.01)

(58) Field of Classification Search
CPC ............ H04N 5/2621; G06T 5/00; G06T 2207/20081; G06T 2207/20008; G06N 3/08

See application file for complete search history.

(56) References Cited

U.S. PATENT DOCUMENTS 9,569,697 B1 * 2/2017 McNerney ........... G06K 9/6267
2015/0325023 A1 * 11/2015 Gross ..................... G06T 11/60
382/203

FOREIGN PATENT DOCUMENTS

| KR | 10-2015-0087362 A | 7/2015 |
| KR | 10-2018-0000255 A | 1/2018 |
| WO | 2014/100774 A1 | 6/2014 |

OTHER PUBLICATIONS

Communication dated Jul. 31, 2019 by the Korean Patent Office in application No. 10-2018-0012389.

* cited by examiner

*Primary Examiner* — Ahmed A Berhan
(74) *Attorney, Agent, or Firm* — Sughrue Mion, PLLC

(57) ABSTRACT

A terminal according to the present disclosure comprises an inputter for receiving input of a preview image converted from light reflected from surroundings of the terminal; a controller for identifying a type of an object included in the preview image and selecting two or more image filters using a recommended algorithm regarding an image filter to be applied to the preview image; and a display for displaying the preview image to which the selected two or more image filters are applied, wherein the controller may apply a first image filter of the two or more filters to a first image area of the preview image and apply a second image filter that is different from the first image filter to a second image area that is an area excluding the first image area of the preview image.

18 Claims, 11 Drawing Sheets

(51) Int. Cl.
*G06T 5/20* (2006.01)
*G06N 3/08* (2006.01)

TERMINAL AND IMAGE PROCESSING METHOD THEREOF

CROSS-REFERENCE TO THE RELATED APPLICATION

This application claims priority from Korean Patent Application No. 10-2018-0012389, filed on Jan. 31, 2018, the disclosure of which is incorporated herein in its entirety by reference.

BACKGROUND

1. Field

The disclosed embodiments relate to a terminal capable of recommending two or more image filters predicted to be selected by a user according to a type of an object included in an image that the user intends to photograph, and an image processing method thereof.

2. Description of the Related Art

As communication technologies develop and electronic devices become miniaturized, personal terminals are coming into wide use for general consumers. Especially, in recent days, portable personal terminals such as smart phones or smart tablet PCs are becoming widely used. Most of the terminals contain image photographing technology. Using the terminal, a user may photograph an image that includes various objects.

Further, the user may correct the photographed image using various applications downloadable onto the terminal. For example, the user may correct the photographed image using various image filters being provided from the applications. Since there are various image filters being provided through the applications, it may be difficult for the user to apply all the image filters to the photographed image. Further, the user may not know which image filter is most appropriate to the object included in the photographed image.

SUMMARY

According to the disclosed embodiments, there may be provided a terminal that is capable of recommending two or more image filters appropriate to a type of an object included in an image to be photographed by a user and an image processing method thereof.

Further, according to the embodiments, there may be provided a terminal capable of improving convenience of the user by automatically recommending two or more image filters and an image processing method thereof.

An image processing method being performed in a terminal according to the embodiments of the present disclosure may include receiving input of a preview image converted from light reflected from surroundings of the terminal; identifying a type of an object included in the preview image; preparing a recommended algorithm regarding an image filter to be applied to the preview image; selecting two or more different image filters corresponding to the type of the object using the recommended algorithm; and outputting the preview image to which the selected two or more image filters are applied.

According to the embodiments, the image processing method being performed in the terminal may further include preparing a learning model for identifying the type of the object included in the preview image, the model being learned regarding correlation between image data of numerous photographs and types of objects included in the numerous photographs prior to identifying the type of the object included in the preview image.

According to the embodiments, the preparing the recommended algorithm regarding the image filter to be applied to the preview image may include preparing a learning model for recommending the image filter, the model being learned regarding a correlation between types of objects included in numerous images and types of image filters selected in order to correct the numerous images.

According to the embodiments, the selecting the two or more different image filters corresponding to the type of the object using the recommended algorithm may include selecting the two or more image filters predicted to have high probability to be selected by a user of the terminal according to the type of the object included in the preview image using the learning model for recommending the image filter and the preview image.

According to the embodiments, the selecting the two or more different image filters corresponding to the type of the object using the recommended algorithm may further include selecting a first image filter predicted to have a highest probability to be selected by the user of the terminal according to the type of the object included in the preview image and a second image filter predicted to have a second highest probability to be selected by the user of the terminal according to the type of the object included in the preview image.

According to the embodiments, the outputting the preview image to which the selected two or more image filters are applied may include applying the first image filter to a first image area of the preview image; and applying the second image filter to a second image area that is an area excluding the first image area of the preview image.

According to the embodiments, the outputting the preview image to which the selected two or more image filters are applied may further include receiving a touch drag input that is input into a first display area of the terminal corresponding to the first image area or a second display area of the terminal corresponding to the second image area; and changing the image filter applied to the image area corresponding to the display area to which the touch drag input is received to a third image filter that is different from the second image filter.

According to the embodiments, the third image filter may be predicted to have a third highest probability to be selected by the user of the terminal according to the type of the object included in the preview image using the learning model for recommending the image filter and the preview image.

According to the embodiments, the receiving the touch drag input that is input into the first display area of the terminal corresponding to the first image area or the second display area of the terminal corresponding to the second image area may include receiving the touch drag input that is input into the first display area or the second display area, the touch drag input being towards a first direction that is perpendicular to a direction from the first display area towards the second display area, or towards a second direction that is opposite to the first direction.

According to the embodiments, the outputting the preview image to which the selected two or more image filters are applied may further include receiving a touch drag input that starts from an arbitrary point on a boundary of the first display area and the second display area; adjusting a ratio of the first image area and a ratio of the second image area based on the touch drag input; determining whether either one of the ratio of the first image area and the ratio of the second image area became a reference ratio or above; and applying the image filter applied to the image area having the ratio that became the reference ratio or above to an entire area of the preview image, depending on a result of the determining.

According to the embodiments, the determining whether either one of the ratio of the first image area and the ratio of the second image area became the reference ratio or above may include determining whether either one of a size of the first image area and a size of the second image area became a reference size or above.

According to the embodiments, the determining whether either one of the ratio of the first image area and the ratio of the second image area became the reference ratio or above may include determining whether a width of the first image area and a width of the second image area became a reference width or above.

According to the embodiments, the image processing method being performed in a terminal may further include, after the applying the image filter applied to the image area having the ratio that became the reference ratio or above to the entire area of the preview image, outputting a photograph icon; and in response to receiving a touch input into the photograph icon, storing the preview image to which the image filter is applied, the image filter being that applied to the image area having the ratio that became the reference ratio or above.

According to the embodiments, the adjusting the ratio of the first image area and the ratio of the second image area based on the touch drag input, in response to receiving the touch drag input from the arbitrary point on the boundary of the first display area and the second display area in a direction from the second display area towards the first display area, may increase the ratio of the second image area in the preview image to be proportionate to a distance between a starting point of the touch drag input and an end point of the touch drag input.

According to embodiments, the adjusting the ratio of the first image area and the ratio of the second image area based on the touch drag input, in response to receiving the touch drag input from the arbitrary point on the boundary of the first display area and the second display area in a direction from the first display area towards the second display area, may increase the ratio of the first image area in the preview image to be proportionate to a distance between a starting point of the touch drag input and an end point of the touch drag input.

A terminal according to embodiments of the present disclosure may include an inputter for receiving input of a preview image converted from light reflected from surroundings of the terminal; a controller for identifying a type of an object included in the preview image and selecting two or more image filters using a recommended algorithm regarding an image filter to be applied to the preview image; and a display for displaying the preview image to which the selected two or more image filters are applied, wherein the controller may apply a first image filter of the selected two or more filters to a first image area of the preview image and apply a second image filter that is different from the first image filter to a second image area that is an area excluding the first image area of the preview image.

According to embodiments, the display may receive a touch drag input that is input into a first display area of the display corresponding to the first image area or a second display area of the display corresponding to the second image area, and the controller may change the image filter applied to the image area corresponding to the display area to which the touch drag input is received to a third image that is different from the first image filter and the second image filter.

According to embodiments, the display may receive the touch drag input that is input into the first display area or the second display area, the touch drag input being towards a first direction that is perpendicular to a direction from the first display area towards the second display area or towards a second direction that is opposite to the first direction.

According to embodiments, the display may receive a touch drag input that starts from an arbitrary point on a boundary of a first display area of the display corresponding to the first image area and a second display area of the display corresponding to the second image area, and adjust a ratio of the first image area and a ratio of the second image area based on the touch drag input, and the controller may determine whether either one of the ratio of the first image area and the ratio of the second image area became a reference ratio or above, and apply the image filter applied to the image area having the ratio that became the reference ratio or above to an entire area of the preview image, depending on a result of the determining.

According to the disclosed embodiments, the two or more different image filters appropriate to the type of the object included in the image to be photographed by the user may be automatically recommended.

Further, according to the embodiments, the two or more different image filters may be automatically recommended, thereby improving convenience of the user.

DETAILED DESCRIPTION

Figure 1:
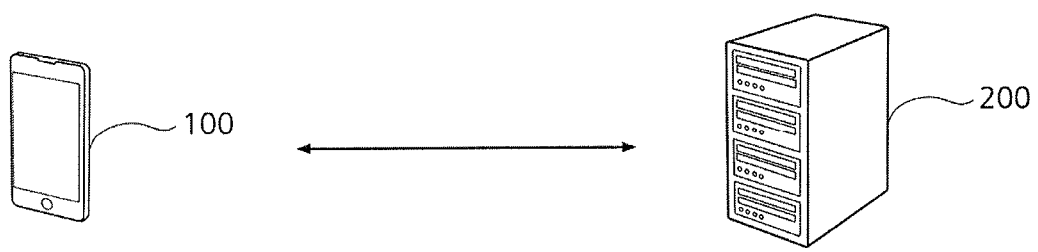
FIG. 1 is a network configuration diagram of an environment where an electronic device operates according to an embodiment of the present disclosure.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be realized in various different forms, and the present embodiments are provided merely for the purpose of complete disclosure of the present disclosure, and for the purpose of informing a person skilled in the art of the scope of the present disclosure, and the present disclosure is to be defined only by the scope of the claims. Like reference numerals indicate like configurative elements through the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to explain the embodiments, and not to limit the present disclosure. In the present specification, a singular form includes plural forms unless specially mentioned otherwise. "Comprises" or "comprising" used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a network configuration diagram of an environment where an electronic device operates according to an embodiment of the present disclosure. According to FIG. 1, the environment where the electronic device 100 operates may include a server 200 and the electronic device 100. For example, the environment where the electronic device 100 operates may not include the server 200.

The electronic device 100 may be connected through medium of the server 200. For convenience of explanation of the present disclosure, one electronic device is illustrated in FIG. 1. However, there is no limitation to the number of the electronic devices. The electronic device 100 may be embodied as one of desktop computer, laptop computer, smartphone, smart tablet, smart watch, mobile terminal, digital camera, wearable device, and portable electronic device. The electronic device 100 may execute a program or an application.

The electronic device 100 may be connected to a communication network. The electronic device 100 may be connected to another external device through the communication network. The electronic device 100 may output data to the other device connected thereto or receive data from the other device.

The communication network connected with the electronic device 100 may include wired communication network, wireless communication network, or composite communication network. The communication network may include mobile communication network such as 3G, LTE or LTE-A, etc. The communication network may include wired or wireless communication network such as Wi-Fi, UMTW/GPRS or Ethernet, etc. The communication network may include short-distance communication network such as Magnetic Secure Transmission (MST), Radio Frequency Identification (RFID), Near Field Communication (NFC), ZigBee, Z-Wave, Bluetooth, Bluetooth Low Energy (BLE), and InfraRed communication (IR), etc. The communication network may include Local Area Network (LAN), Metropolitan Area Network (MAN), or Wide Area Network (WAN), etc.

The server 200 may store various programs or applications and data so that a user of the electronic device 100 may correct a photographed image using the electronic device 100.

Hereinbelow, for convenience of explanation of the present disclosure, the electronic device and terminal may be used to have the same meaning. Further, the communication method of the electronic device 100 and server 200 will be explained with reference to FIGS. 2 to 11.

Figure 2:
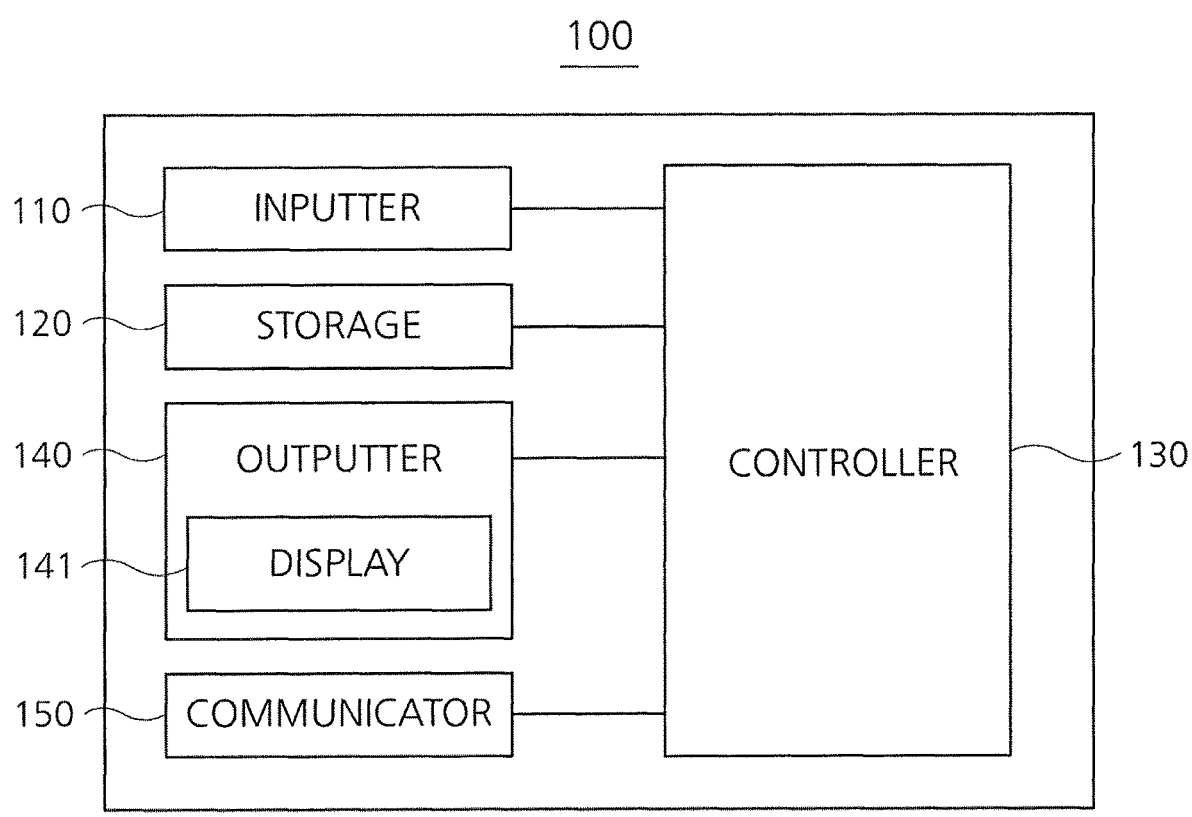
FIG. 2 is a block diagram illustrating a configuration of a terminal according to the embodiment of the present disclosure.

FIG. 2 is a block diagram illustrating a configuration of the terminal according to an embodiment of the present disclosure. Referring to FIG. 2, the terminal 100 may include an inputter 110, storage 120, controller 130, outputter 140 and communicator 150.

The inputter 110 may receive signals from outside. The inputter 110 may receive the signals from the user of the terminal 100. Further, the inputter 110 may receive the signals from an external device. For example, the inputter 110 may include a microphone, camera, keyboard, mouse, trackball, touchscreen, button, switch, sensor, network interface, or other input devices, etc. The inputter 110 may receive voice from outside through the microphone included in the inputter 110. Further, the inputter 110 may receive a photographed image from the camera included in the inputter 110 or a gesture from the user. Otherwise, the inputter 110 may receive input of a preview image converted from light reflected from surroundings of the terminal 100. The touchscreen included in the inputter 110 may receive a touch input from the user of the terminal 100.

The storage 120 may store data. The storage 120 may store the voice or image data received from the inputter 110. Further, the storage 120 may store a computation result executed by the controller 130. For example, the storage 120 may store a voice encoded by the controller 130. The storage 120 may the store data to be output externally through the communicator 150 or store the data received from outside through the communicator 150.

The storage 120 may store software or programs. For example, the storage 120 may store applications, programs such as application programming interfaces (API), and various types of data. The storage 120 may store commands that may be executed by the controller 130.

The storage 120 may include at least one of a volatile memory or non-volatile memory. For example, the storage 120 may include at least one of a flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) or register. For example, the storage 120 may include a file system, database, or embedded database, etc.

The controller 130 or each of the configuration elements included in the controller 130 may be embodied in the form of software or hardware. For example, the software may be embodied by program execution commands such as mechanical code, firmware code, embedded code, and application, etc. The hardware may be electric electronic circuit, processor, computer, pressure sensor, inertia sensor, microelectromechanical system (MEMS), passive elements, or a combination thereof.

The controller 130 may control operations of the terminal 100. The controller 130 may be connected with each of the configuration elements included in the terminal 100. The controller 130 may control operations of each of the configuration elements included in the terminal 100. The controller 130 may control the operations of the terminal 100 in response to the signals received by the inputter 110.

The controller 130 may test the preview image being input through the inputter 110. The preview image may mean an image being input through the inputter 110 before the user of the terminal 100 stores the image being input through the inputter 110. For example, the controller 130 may identify a type of an object included in the input preview image.

The controller 130 may identify whether the type of the object included in the preview image is a thing or a person. More specifically, in the case where the object included in the preview image is a thing, the controller 130 may identify the type, color or pattern of the thing. Otherwise, the controller 130 may identify whether the type of the object included in the preview image is a certain animal, certain food, certain scenery or certain thing.

The controller 130 may select two or more image filters appropriate to the type of the object included in the preview image using a prepared learning model. The method in which the controller 130 selects the two or more image filters may be explained in detail with reference to FIGS. 2 to 8.

The outputter 140 may include a display 141. The display 141 may display a screen. The controller 130 may control such that the screen is displayed on the display 141. The display 141 may display a user interface. The display 141 may display another screen in response to an input from the user.

The display 141 may display data. The display 141 may display the computation result performed by the controller 130. For example, the display 141 may output the preview image to which the two or more image filters selected by the controller 130 are applied. The display 141 may display the data stored in the storage 120. The display 141 may display the data received by the communicator 150. For example, the display 141 may display the image being received from the inputter 110.

For example, the display 141 may include a flat panel display device such as Liquid Crystal Display (LCD), Organic Light Emitting Diode (OLED), or Plasma Display Panel (PDP), etc. The display 141 may include a curved-surface display or a flexible display. The display 141 may include a touchscreen. In the case where the display 141 includes the touchscreen, the display 141 may operate as the inputter 110 at the same time as performing the output operations.

The outputter 140 may output sound. The outputter 140 may output the sound received through the inputter 110 or the sound received through an external device. For example, the outputter 140 may include a speaker.

The communicator 150 may output data externally or receive data from outside. The communicator 150 may output the data to the server 200 or an external device. The communicator 150 may receive the data from the server 200 or the external device. The communicator 150 may externally output the computation result performed by the controller 130. Further, the communicator 150 may externally output the data stored in the storage 120.

The data to be output by the communicator 150 or the data received by the communicator 150 may be stored in the storage 120. For example, the communicator 150 may output a message created in the controller 130 to the server 200.

For example, the communicator 150 may include a remote-distance network interface such as 3G module, LTE module, LTE-A module, Wi-Fi module, WiGig module, Ultra Wide Band (UWB), and LAN card, etc. Further, the communicator 150 may include a short-distance network interface such as magnetic secure (MST) module, Bluetooth module, NFC module, RFID module, ZigBee module, Z-Wave module, or infrared ray module, etc. Further, the communicator 150 may include other network interfaces.

Figure 3:
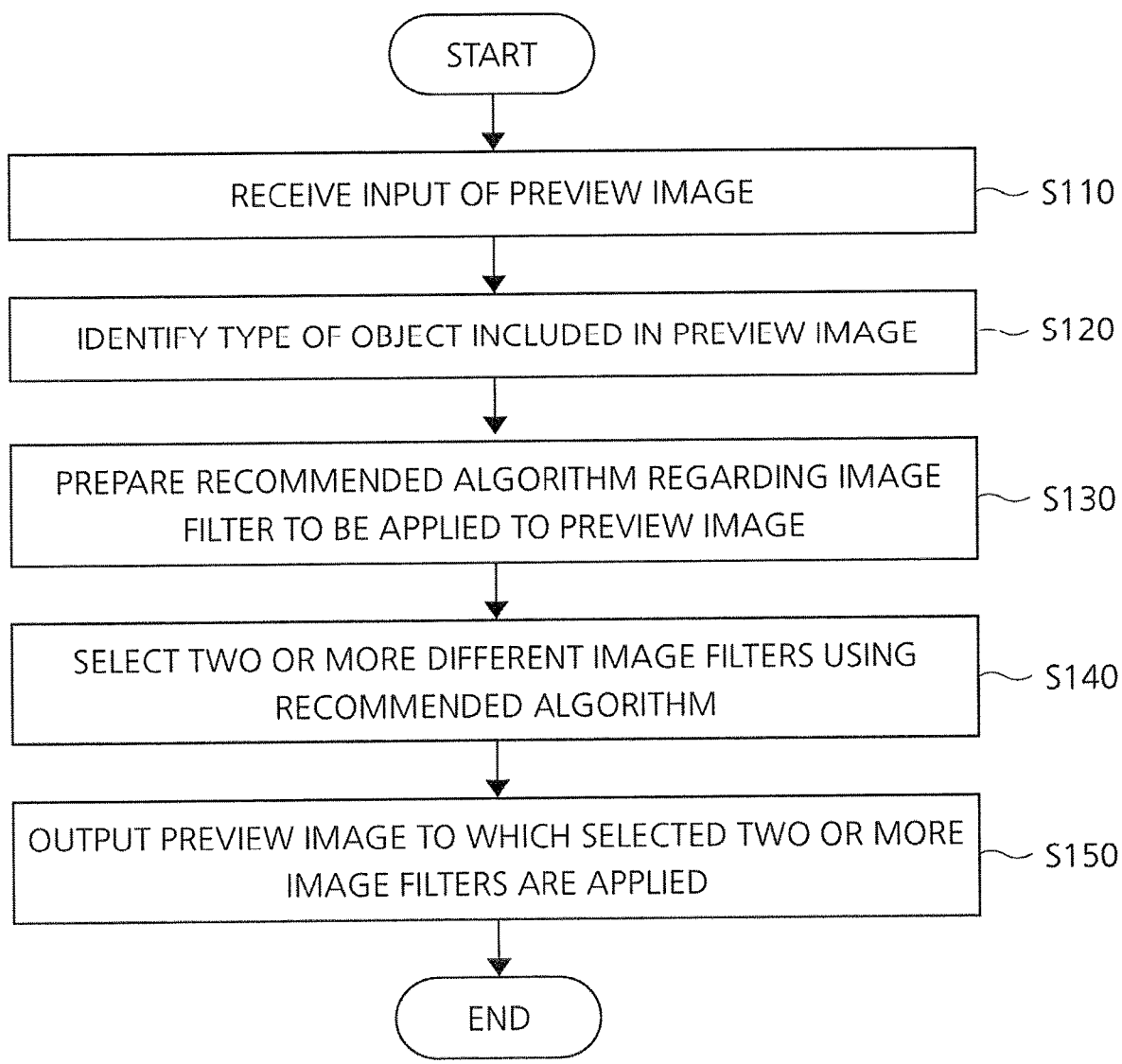
FIG. 3 is a block diagram of an operating method of the terminal according to the embodiment of the present disclosure.

FIG. 3 is a block diagram illustrating the operating method of the terminal according to an embodiment of the present disclosure. At step S110, the inputter 110 of the terminal 100 may receive input of a preview image. For example, the terminal 100 may execute an application that provides a service that may correct the image being input through the inputter 110. Further, the preview image may be an image converted from light reflected from surroundings of the terminal 100.

At step S120, the controller 130 of the terminal 100 may identify the type of the object included in the preview image. For example, the controller 130 of the terminal 100 may identify the type of the object included in the preview image using a prepared learning model.

The prepared learning model may be a data recognition model used in order to identify the type of the object included in the preview image to be corrected through an application. The data recognition model may be a model that is based on an artificial neural network. For example, the learning model may be a model such as Deep Neural Network (DNN), Recurrent Neural Network (RNN), and Bidirectional Recurrent Deep Neural Network (BRDNN) used as the data recognition model, but there is no limitation thereto.

The prepared learning model may be a learning model for identifying the type of the object included in the preview image. The learning model for identifying the type of the object may be a result learned regarding a correlation between image data of numerous photographs and types of objects included in the numerous photographs. For example, the terminal 100 may learn the correlation between the image data of the numerous photographs and the types of objects included in the numerous photographs. The terminal 100 may train an artificial neural network based on a learning result, and create the learning model for identifying the type of the object included in the preview image.

In another example, the terminal 100 may receive the learning model for identifying the type of the object from the server 200. In such a case, the server 200 may create the learning model for identifying the type of the object included in the preview image.

At step S130, the controller 130 of the terminal 100 may prepare a recommended algorithm regarding the image filter to be applied to the preview image. For example, the prepared recommended algorithm may be the data recognition model being used for correcting the preview image through the application. The data recognition model may be a model that is based on the artificial neural network. For example, the learning model may be the data recognition model such as DNN, RNN and BRDNN, but there is no limitation thereto.

The prepared recommended algorithm may be the learning model for recommending the image filter to be used in correcting the preview image. The learning model for recommending the image filter may be the learning result regarding the correlation between the types of objects included in the numerous images and the types of image filters selected by the user in order to correct the numerous images. For example, the terminal 100 may learn the correlation between the types of objects included in the numerous images and the type of the image filter selected in order to correct the numerous images. For example, the type of the image filter may be a correcting effect selected by the user of the terminal 100 in order to correct a certain image among the numerous images. The terminal 100 may train the artificial neural network based on the learning result, and create the learning model for selecting the type of the image filter to be used in correcting the preview image.

In another example, the terminal 100 may receive the recommended algorithm for recommending the image filter from the server 200. In such a case, the server 200 may create the recommended algorithm for recommending the image filter.

At step S140, the controller 130 of the terminal 100 may select two or more image filters using the recommended algorithm for selecting the image filter. For example, the controller 130 of the terminal 110 may select the two or more image filters in order to correct the object included in the preview image.

The controller 130 of the terminal 110 may apply the preview image to the learning model for recommending the image filter and select the two or more image filters predicted to have high probability to be selected by the user of the terminal 100 according to the type of the object included in the preview image. For example, the controller 130 of the terminal 100 may select the image filter predicted to have a highest probability to be selected by the user of the terminal 100 and the image filter predicted to have a second highest probability to be selected by the user of the terminal 100 according to the type of the object included in the preview image.

At step S150, the outputter 140 of the terminal 100 may output the preview image to which the selected two or more image filters are applied. For example, the outputter 140 of the terminal 100 may divide the preview image into two or more image areas, and apply each of the selected two or more image filters to each of the two or more image areas, respectively. The method for outputting the preview image corrected using the two or more image filters may be explained with reference to FIG. 4.

Figure 4:
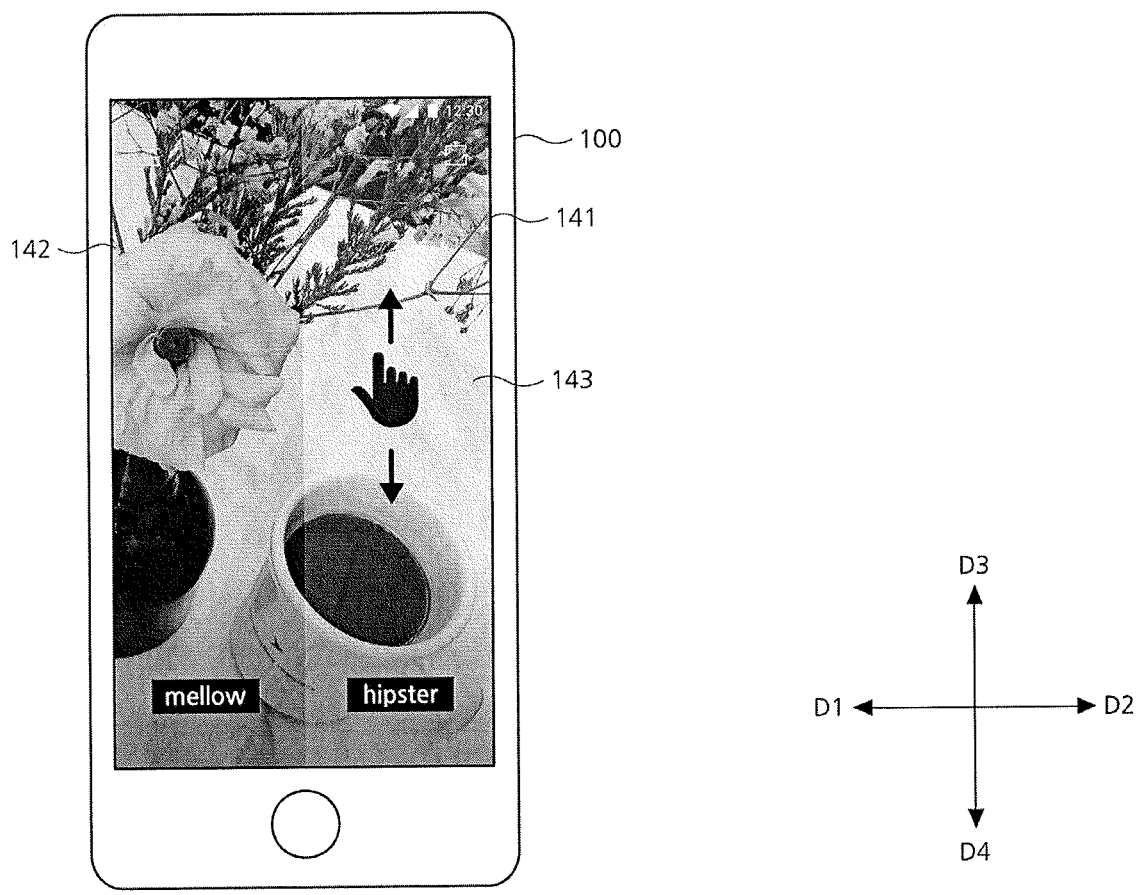
FIG. 4 is a view illustrating the terminal where a preview image corrected using two or more image filters according to an embodiment of the present disclosure are being output.

FIG. 4 is a view illustrating the terminal to which the preview image corrected using the two or more image filters is being output according to the embodiments of the present disclosure. Referring to FIGS. 3 and 4, the preview image may be displayed through the outputter 141 of the terminal 100. For example, a first display area 142 of the display 141 may correspond to a first image area of the preview image, and a second display area 143 may correspond to a second image area of the preview image.

Different image filters may be applied to each of the first image area being displayed through the first display area 142 and the second image area being displayed through the second display area 143. For example, in the first display area 142, the first image area to which the first image filter (for example, 'mellow' image filter) is applied may be displayed, and in the second display area 143, the second image area to which image filter (for example, 'hipster' image filter) is applied may be displayed. That is, the first image area may be a range where the first filter is applied in the preview image, and the second image area may be a range where the second image filter is applied in the preview image.

For example, the first image area may correspond to a left partial area of the preview image. The second image area may correspond to a right partial area of the preview image.

Further, the second image area may correspond to a remaining area excluding the first image area from the preview image. However, there is no limitation thereto, and the first image area may correspond to an upper partial area of the preview image. The second image area may correspond to a lower partial area of the preview image. Further, the second image area may correspond to the remaining area excluding the first image area from the preview image.

For example, the first image filter applied to the first image area may be an image filter predicted to have the highest probability to be selected by the user of the terminal 100 according to the type of the object included in the preview image in the controller 130. The second image filter applied to the second image area may be the image filter predicted to have the second highest probability to be selected by the user of the terminal 100 according to the type of the object included in the preview image in the controller 130. The image filter applied to the first image area or the second image area may be changed by the input of the user being received in the screen of the terminal 100. The method for changing the image filter applied to the first image filter or the second image area will be explained with reference to FIG. 5.

Figure 5:
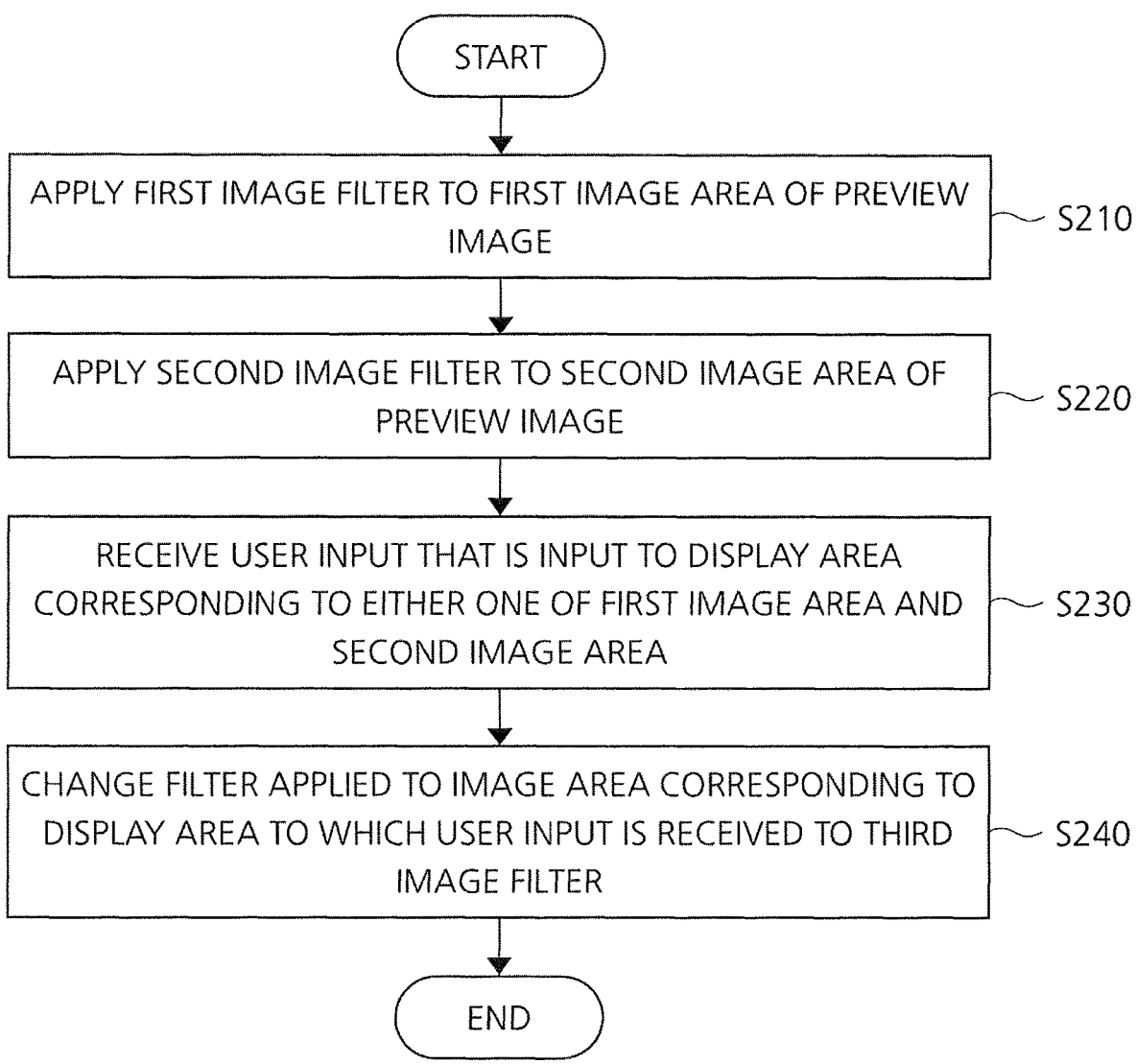
FIG. 5 is a flowchart illustrating an image filter application method of the terminal according to the embodiment of the present disclosure.

FIG. 5 is a flowchart illustrating the image filter application method of the terminal according to the embodiments of the present disclosure. Referring to FIGS. 4 and 5, at step S210, the controller 130 of the terminal 100 may apply the first image filter to the first image area of the preview image. At step S220, the controller 130 of the terminal 100 may apply the second image filter to the second image area of the preview image.

As illustrated in FIG. 4, to each of the first image area and the second image area of the preview image, different image filters may be applied. Further, the display 141 of the terminal 100 may display the first image area and the second image area to each of which different image filters are applied. Specifically, in the first display area 142 of the display 141, the first image area to which the first image filter is applied may be displayed, and in the second display area 143 of the display, the second image area to which the second image filter is applied may be displayed.

At step S230, the terminal 100 may receive the user input that is input into either one of the first display area 142 and the second display area 143. For example, the display 141 may be embodied as a touchscreen and be driven by the inputter 110. The terminal 100 may receive a touch drag input that is input into the first display area 142 or the second display area 143. The terminal 100 may receive either one of the touch drag input towards a third direction D3 that is input into either one of the first display area 142 and the second display area 143 or the touch drag input towards a fourth direction D4 that is opposite to the third direction D3.

For example, the direction from the second display area 143 towards the first display area 142 may be a first direction D1, and the direction from the first display area 142 towards the second display area 143 may be a second direction D1. Further, each of the third direction D3 and the fourth direction D4 may be perpendicular to the direction from the first display area 142 towards the second display area 143 on a plane that includes the surface of the display 141. More specifically, a direction of an outer product of the third direction D3 with the first direction D1 may be identical to the direction in which the display 141 emits light, and the fourth direction D4 may be a direction opposite to the third direction D3.

At step S240, the controller 130 of the terminal 100 may change the image filter applied to the image area corresponding to the display area to which the user input is received to the third image filter. The method for changing the image filter may be explained with reference to FIG. 6.

Figure 6:
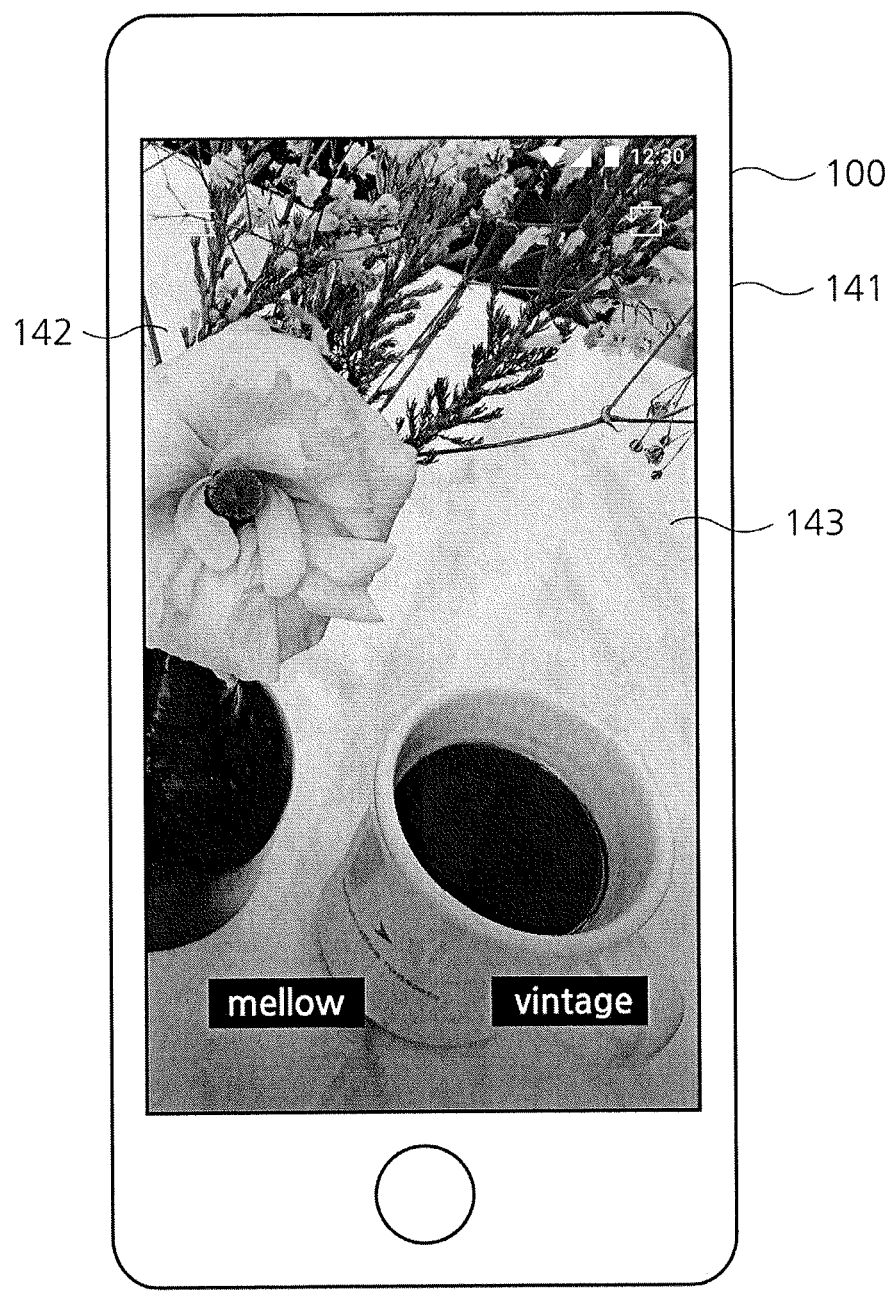
FIG. 6 is a view illustrating the terminal where a preview image corrected using two or more image filters according to another embodiment of the present disclosure is being output.

FIG. 6 is a view illustrating a terminal where a preview image corrected using two or more image filters is being output according to another embodiment. Referring to FIGS. 4 and 6, a touch drag input may be received in the second display area 143 of the display 141. In the case where the touch drag input is input into the second display area 143, the filter applied to the second image area may be changed from the second image filter to the third image filter (for example, 'vintage' image filter). For example, the third image filter may be an image filter predicted to have a third highest probability to be selected by the user of the terminal 100 according to the type of the object included in the preview image in the controller 130 of the terminal 100.

For example, in the case where a touch drag input in the third direction D3 is received into the second display area 143, the image filter applied to the second image area may be changed from the second image filter to the third image filter. Thereafter, in the case where a touch drag input in the fourth direction D4 is received into the second display area 143, the image filter applied to the second image area may be changed from the third image filter to the second image filter again.

Conversely, in the case where the touch drag input in the fourth direction D4 is received in the second display area 143, the image filter applied to the second image area may be changed from the second image filter to the third image filter. Thereafter, in the case where the touch drag input in the third direction D3 is received into the second display area 143, the image filter applied to the second image area may be changed from the third image filter to the second image filter again.

In another example, after the image filter applied to the second image area is changed from the second image filter to the third image filter, a touch drag input in the third direction D3 or the fourth direction D4 may be received into the first display area 142. Here, the image filter applied to the first image area may be changed from the first image filter to the second image filter or to the fourth image filter. For example, the second image filter may be an image filter predicted to have a fourth highest probability to be selected by the user of the terminal 100 according to the type of the object included in the preview image in the controller 130 of the terminal 100.

In the case where the touch drag input in the third direction D3 or the fourth direction D4 is not received in the second display area 143 but the touch drag input in the third direction D3 or the fourth direction D4 is received in the first display area 142, the image filter applied to the first image area may be changed from the first image filter to the third image filter. After the image filter applied to the first image area is changed from the first image filter to the third image filter, the touch drag input in the third direction D3 or the fourth direction D4 may be received in the second display area 143. Here, the image filter applied to the second image area may be changed from the second image filter to the first image filter or the fourth image filter.

As explained with reference to FIGS. 4 to 6, the terminal 100 may identify the type of the object included in the preview image being input from outside, and select two or more image filters to be applied to the identified object. More specifically, the terminal 100 may select the two or more image filters appropriate to the type of the object using the prepared learning model. Through such a method, the two or more image filters to be applied to the preview image being input into the terminal 100 may be automatically recommended. Further, as the two or more image filters are automatically recommended, convenience of the user may be improved. The user of the terminal 100 may change the type of the image filter to be applied to the preview image through a simple touch drag input, and compare which image filter is more appropriate to the preview image. Through such an operating method, convenience of the user may be improved.

Figure 7:
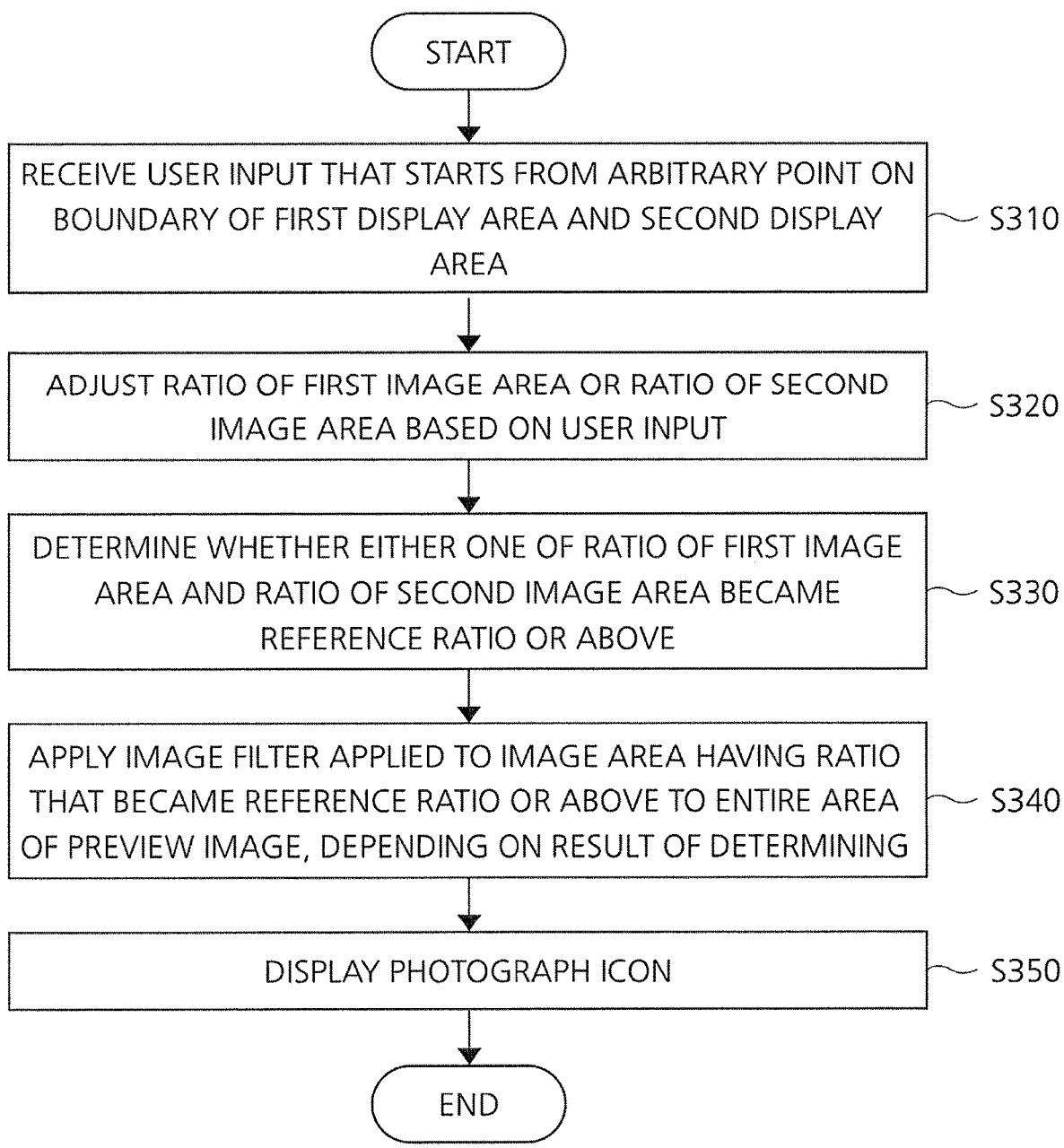
FIG. 7 is a flowchart illustrating an operating method of the terminal according to the other embodiment of the present disclosure.

FIG. 7 is a flowchart illustrating the operating method of the terminal according to another embodiment of the present disclosure. The operating method of the terminal may be explained with reference to FIGS. 8 to 11. FIGS. 8 to 11 are views illustrating the method for adjusting the ratio of two or more image areas of the preview image according to the embodiments of the present disclosure.

Figure 8:
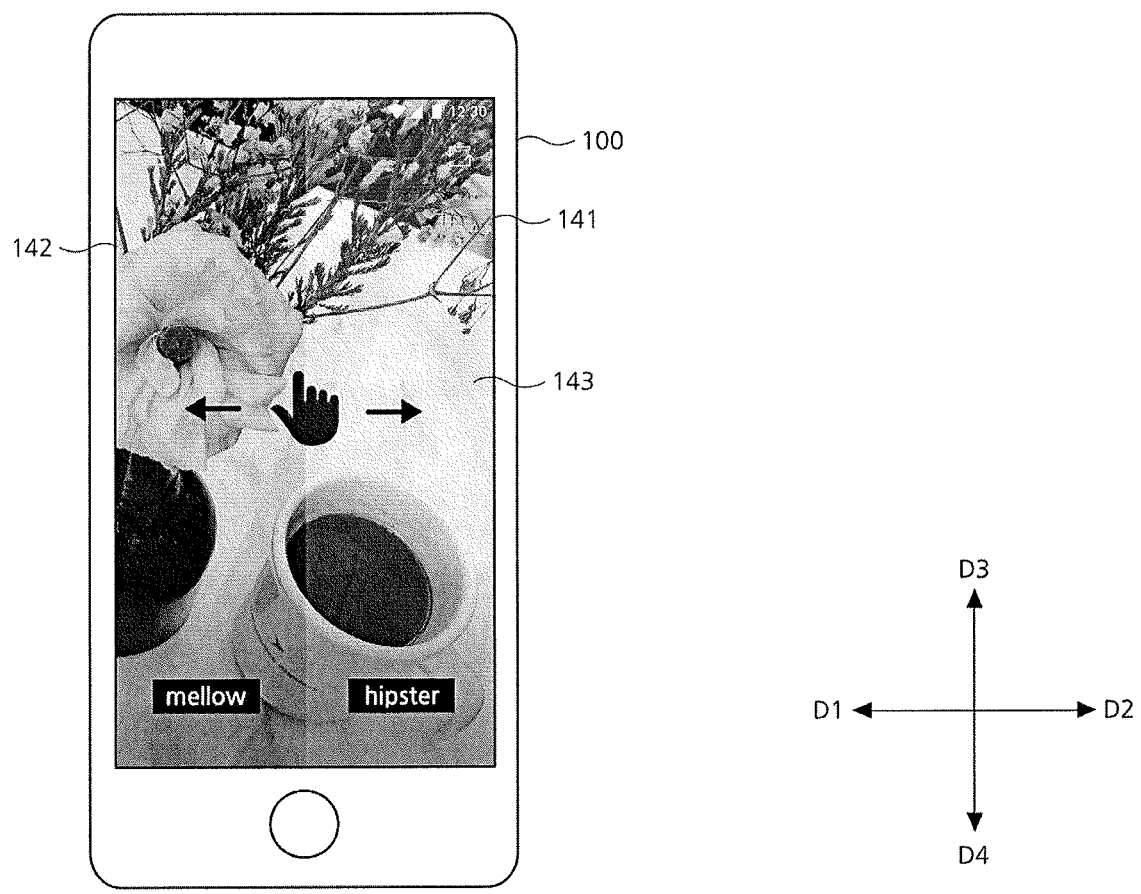
FIGS. 8 to 10 are figures illustrating a method for adjusting a ratio of the two or more image areas of the preview image according to an embodiment of the present disclosure.
Figure 9:
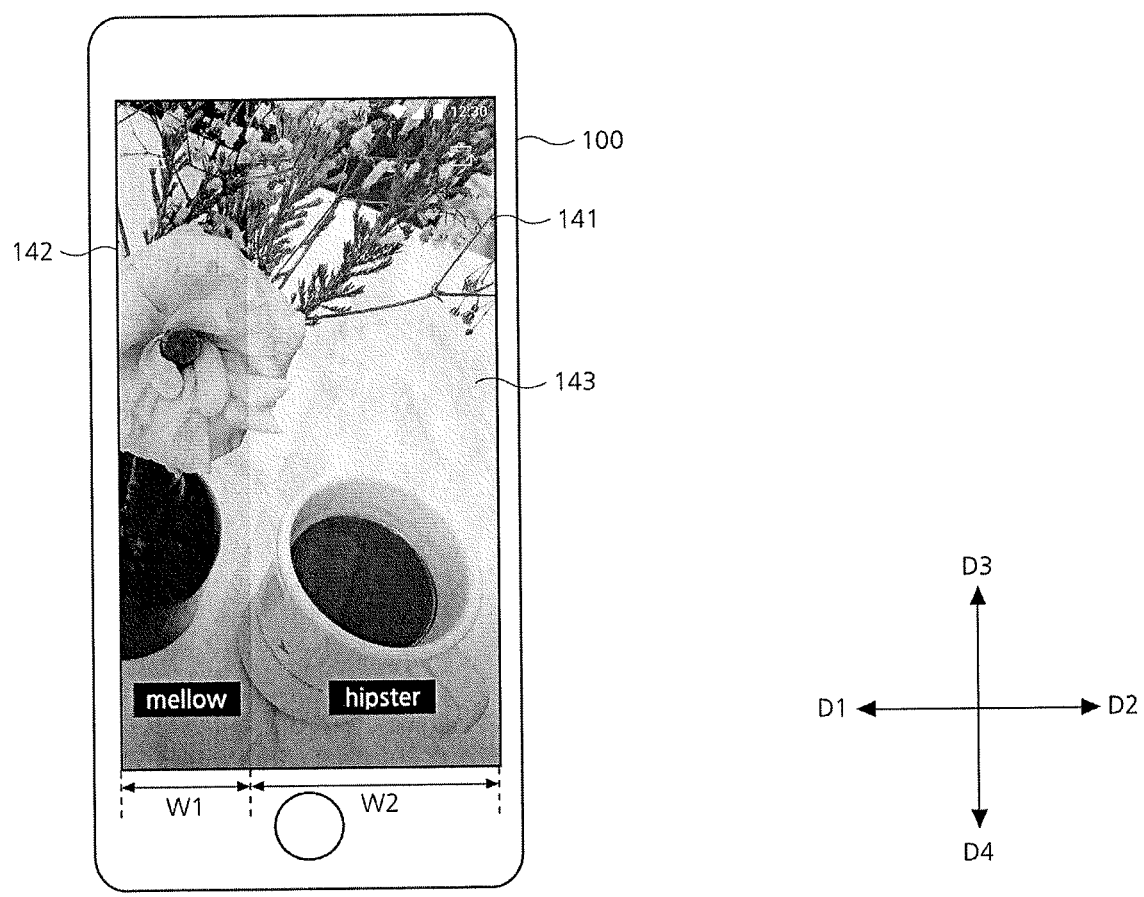

Referring to FIG. 7 and FIG. 8, at step S310, the display 141 of the terminal 100 may receive input of the user that starts from the arbitrary point on the boundary of the first display area 142 and the second display area 143.

For example, the display 141 of the terminal 100 may receive the touch drag input that starts from the arbitrary point on the boundary of the first display area 142 and the second display area 143. Referring to FIG. 8, the terminal 100 may touch the arbitrary point on the boundary of the first display area 142 and the second display area 143, and receive either one of the user input of dragging to the first direction D1 and the user input of dragging to the second direction D2 that is opposite to the first direction D1. For example, the first direction D1 may be a direction from the second display area 143 to the first display area 142, and the second direction D2 may be a direction from the first display area 142 to the second display area 143.

At step S320, the terminal 100 may adjust the ratio of the first image area or the second image area of the preview image based on the user input. For example, referring to FIG. 9, in the case where the touch drag input in the first direction D1 that starts from the arbitrary point of the boundary on the first display area 142 and the second display area 143 is received, the terminal 100 may increase the ratio of the second image area in the preview image to be proportionate to a distance between a starting point and an end point of the touch drag input. Further, the ratio of the first image area will decrease as much as the ratio of the second image area increased. When the size of the second image area increases, the size of the second display area 143 corresponding to the second image area may increase as well.

When the ratio of the second image area increases higher than the first image area, the width W2 of the second image area being displayed in the second display area 143 may be larger than the width W1 of the first image area being displayed in the first display area 142, and the size of the second image area to which the second image filter is applied may be larger than the first image area to which the first image filter is applied in the preview image.

Figure 10:
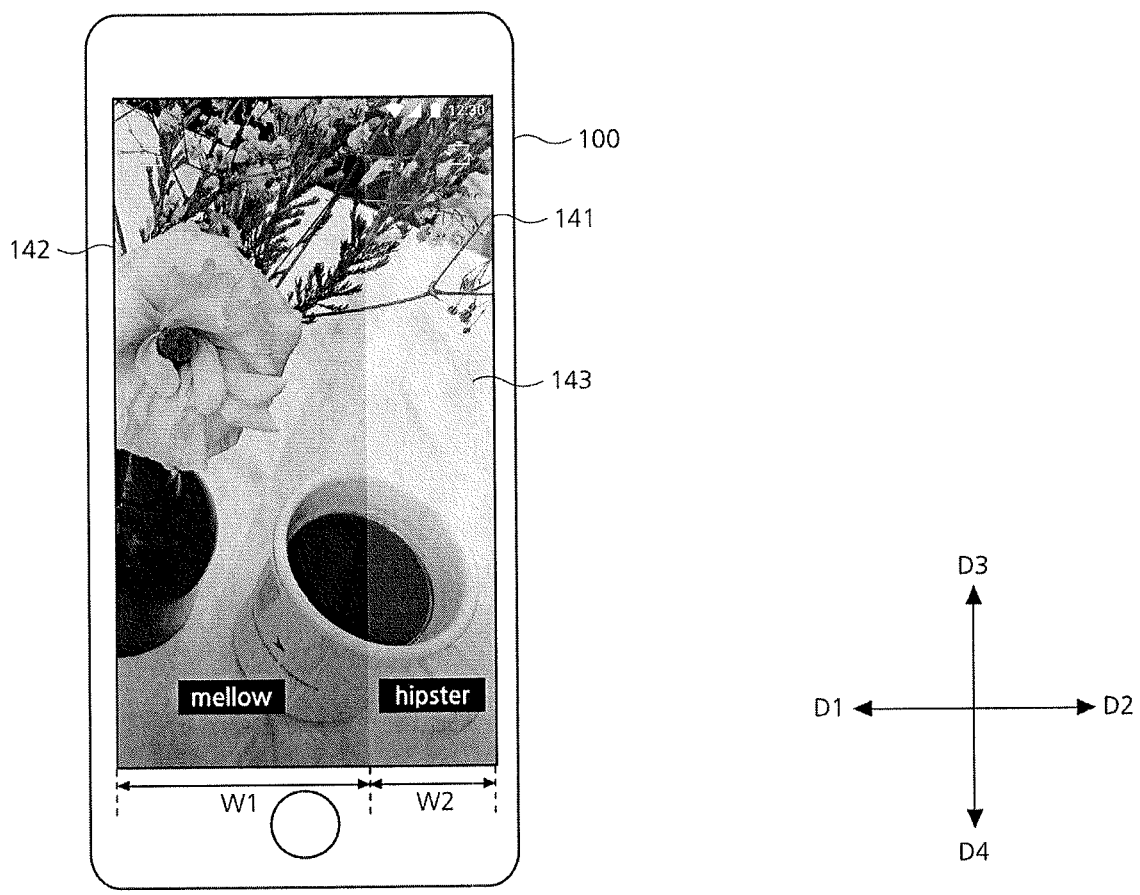

Referring to FIG. 10, in the case where the touch drag input in the second direction D2 that starts from the arbitrary point on the boundary of the first display area 142 and the second display area 143 is received, the terminal 100 may increase the ratio of the first image area in the preview image to be proportionate to the distance between the starting point and the end point of the touch drag input. Further, the ratio of the second image area will decrease as much as the ratio of the first image area increased. When the size of the first image area increases, the size of the first display area 142 corresponding to the first image area may increase as well.

When the ratio of the first image area increases higher than the second image area, the width W1 of the first image area being displayed in the first display area 142 may become larger than the width W2 of the second image area being displayed in the second display area 143, and the size of the first image area to which the first image filter is applied may be larger than the size of the second image area to which the second image filter is applied in the preview image.

Referring to FIG. 7 again, at step S330, the controller 130 of the terminal 100 may determine whether either one of the ratio of the first image area and the ratio of the second image area became a reference ratio or above. The controller 130 of the terminal 100 may compare either one of the ratio of the first image area and the ratio of the second image area with the reference ratio in various methods.

For example, the controller 130 of the terminal 100 may determine whether either one of the ratio of the first image area and the ratio of the second image ratio became the reference ratio or above. In another example, the controller 130 of the terminal 100 may determine whether either one of the size of the first image area and the size of the second image area became the reference size or above. In another example, the controller 130 of the terminal 100 may determine whether either one of the width W1 of the first image area and the width W2 of the second image area became larger than the reference width.

At step S340, according to a result of determining, the controller 130 of the terminal 100 may apply the image filter applied to the image area having the ratio that became the reference ratio or above to an entire area of the preview image.

For example, the controller 130 of the terminal 100 may determine that the ratio of the second image area became the reference ratio or above. In the case where the size of the second image area increased to the reference size or above, and the width W2 of the second image area became the reference width or above, the controller 130 of the terminal 100 may determine that the ratio of the second image area became the reference ratio or above. The method for applying the selected image filter to the entire area of the preview image may be explained with reference to FIG. 11.

Figure 11:
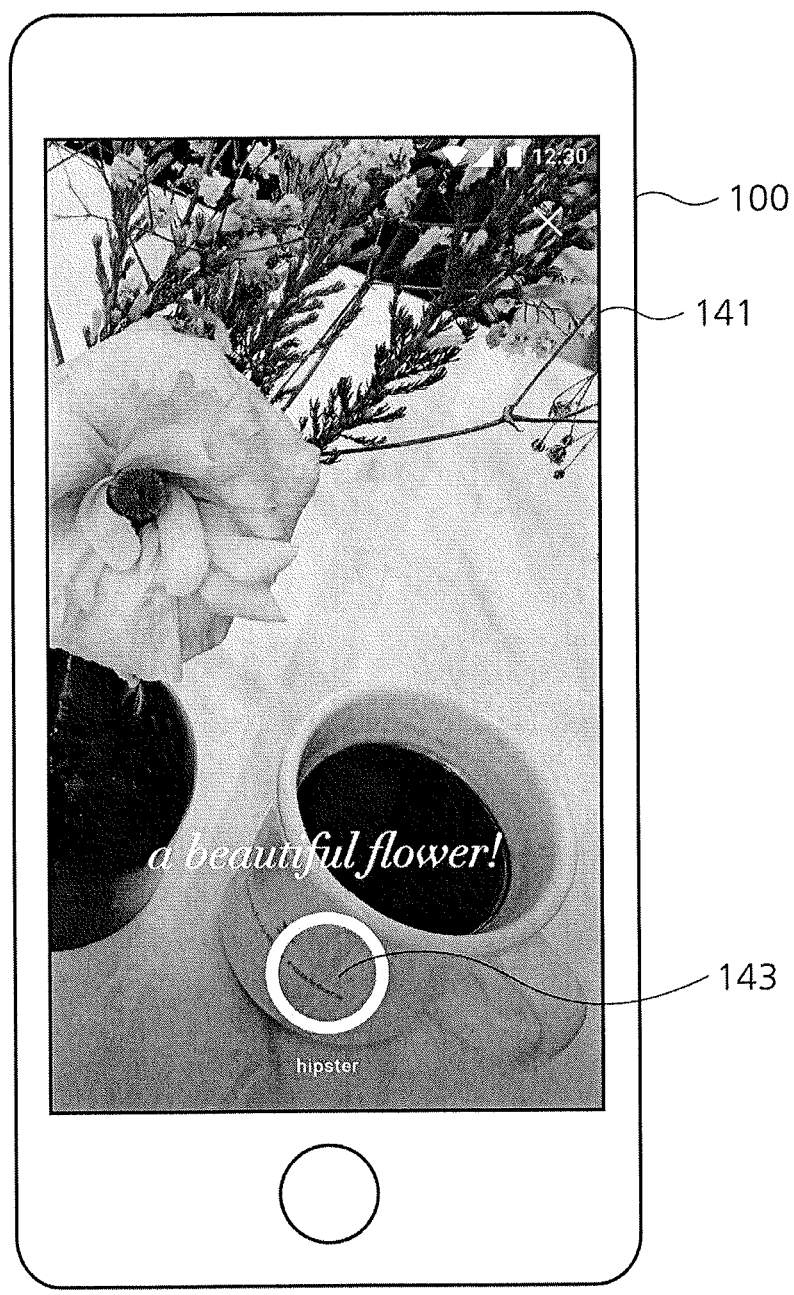
FIG. 11 is a view illustrating the terminal where the preview image corrected using the selected image filter according to the embodiments of the present disclosure is being output.

FIG. 11 is a view illustrating the terminal where the preview image corrected using the selected image filter is being output according to the embodiments of the present disclosure. As illustrated in FIG. 11, the second image (for example, 'hipster' image filter) applied to the second image area may be applied to the entire area of the preview image. After the second image filter applied to the second image area is applied to the entire area of the preview image, at step S350, the terminal 100 may display a photograph icon 13 so that image photographing may be performed.

In the case where it is determined that the ratio of the second image area became the reference ratio or above, the terminal 100 may determine that the second image filter applied to the second image area is selected. Further, the display 141 of the terminal 100 may output the preview image to which the second image filter is applied.

The terminal 100 may apply the second image filter to the entire area of the preview image, and display the photograph icon 144 so that photographing may be performed. For example, in the case where the touch input of the photograph icon 144 is received from the user of the terminal 100, the terminal 100 may photograph the image to which the second image filter is applied. In the case where the image to which the second image filter is applied is photographed, the image to which the second image is applied may be stored in the storage 120 of the terminal 100.

The method for photographing an image by the terminal 100 may be embodied in various ways. After applying the second image filter to the entire area of the preview image, the terminal 100 may output a message for inducing voice input. For example, the terminal 100 may output the message, 'say photograph', and in the case where the voice, 'photograph' is input from the user, the terminal 100 may store the image to which the second image filter is applied. Otherwise, after applying the second image filter to the entire area of the preview image, in the case where a certain motion is input from the user of the terminal 100, the terminal 100 may store the image to which the second image filter is applied.

The embodiments explained above may also be embodied in the form of a record medium that includes commands executable by a computer, such as a program module executable by a computer. The computer-readable record medium may be an arbitrary available medium accessible by a computer, and may include all volatile and non-volatile media, and separable and non-separable media.

Further, the computer-readable medium may include computer storage media. The computer storage medium may include computer-readable commands, data structure, program modules or volatile and non-volatile, separable and non-separable media embodied in an arbitrary method or technology for storing information such as other data.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. An image processing method being performed in a terminal, the method comprising:
   receiving an input of a preview image converted from light reflected from surroundings of the terminal;
   identifying a type of an object included in the preview image;
   obtaining a recommended algorithm regarding an image filter to be applied to the preview image;
   selecting two or more different image filters corresponding to the type of the object using the recommended algorithm; and
   outputting the preview image to which the selected two or more image filters are applied,
   wherein the selecting comprises:
      obtaining a first learning model for recommending the image filter based on an artificial neural network; and
      selecting a first image filter, which is predicted by using the first learning model to have a highest probability to be selected by a user of the terminal according to the type of the object included in the preview image, and a second image filter, which is predicted by using the first learning model to have a second highest probability to be selected by the user of the terminal according to the type of the object included in the preview image.

2. The image processing method according to claim 1, further comprising:
   obtaining a second learning model for identifying the type of the object included in the preview image, the second learning model being learned regarding correlation between image data of numerous photographs and types of objects included in the numerous photographs prior to identifying the type of the object included in the preview image.

3. The image processing method according to claim 1, wherein the obtaining the first learning model comprises obtaining the first learning model that is learned regarding a correlation between types of objects included in numerous images and types of image filters selected in order to correct the numerous images.

4. The image processing method according to claim 1, wherein the outputting comprises:
applying the first image filter to a first image area of the preview image; and
applying the second image filter to a second image area that is an area excluding the first image area of the preview image.

5. The image processing method according to claim 4, wherein the outputting further comprises:
receiving a touch drag input that is input on a first display area of the terminal corresponding to the first image area or a second display area of the terminal corresponding to the second image area; and
changing an image filter applied to an image area corresponding to a display area to which the touch drag input is received to a third image filter that is different from the first image filter and the second image filter.

6. The image processing method according to claim 5, wherein the third image filter is predicted by using the first learning model to have a third highest probability to be selected by the user of the terminal according to the type of the object included in the preview image.

7. The image processing method according to claim 5, wherein the receiving the touch drag input comprises receiving the touch drag input that is input on the first display area or the second display area, the touch drag input being towards a first direction that is perpendicular to a direction from the first display area towards the second display area, or towards a second direction that is opposite to the first direction.

8. The image processing method according to claim 5, wherein the outputting further comprises:
receiving a touch drag input that starts from an arbitrary point on a boundary of the first display area and the second display area;
adjusting a ratio of the first image area and a ratio of the second image area based on the touch drag input;
determining whether one of the ratio of the first image area and the ratio of the second image area becomes a reference ratio or above; and
applying the image filter applied to one of the first image area and the second image area having the reference ratio or above to an entire area of the preview image, based on a result of the determining.

9. The image processing method according to claim 8, wherein the determining comprises determining whether one of a size of the first image area and a size of the second image area becomes a reference size or above.

10. The image processing method according to claim 8, wherein the determining comprises determining whether a width of the first image area and a width of the second image area becomes a reference width or above.

11. The image processing method according to claim 8, further comprising:
after the applying the image filter applied to one of the first image area and the second image area having the reference ratio or above to the entire area of the preview image, outputting a photograph icon; and
in response to receiving a touch input on the photograph icon, storing the preview image to which the image filter is applied, the image filter being that applied to the image area having the ratio that became the reference ratio or above.

12. The image processing method according to claim 8, wherein the adjusting comprises, in response to receiving the touch drag input from the arbitrary point on the boundary of the first display area and the second display area in a direction from the second display area towards the first display area, increasing the ratio of the second image area in the preview image to be proportionate to a distance between a starting point of the touch drag input and an end point of the touch drag input.

13. The image processing method according to claim 8, wherein the adjusting comprises, in response to receiving the touch drag input from the arbitrary point on the boundary of the first display area and the second display area in a direction from the first display area towards the second display area, increasing the ratio of the first image area in the preview image to be proportionate to a distance between a starting point of the touch drag input and an end point of the touch drag input.

14. A non-transitory computer-readable record medium having a program for executing the image processing method according to claim 1 in at least one processor.

15. A terminal comprising:
an inputter configured to receive an input of a preview image converted from light reflected from surroundings of the terminal;
a controller configured to identify a type of an object included in the preview image and select two or more image filters using a recommended algorithm regarding an image filter to be applied to the preview image; and
a display configured to display the preview image to which the selected two or more image filters are applied,
wherein the controller is further configured to:
obtain a learning model for recommending the image filter based on an artificial neural network; and
apply a first image filter, which is predicted by using the learning model to have a highest probability to be selected by a user of the terminal according to the type of the object included in the preview image, to a first image area of the preview image and apply a second image filter, which is predicted by using the learning model to have a second highest probability to be selected by the user of the terminal according to the type of the object included in the preview image, to a second image area that is an area excluding the first image area of the preview image.

16. The terminal according to claim 15, wherein the display is further configured to receive a touch drag input that is input on a first display area of the display corresponding to the first image area or a second display area of the display corresponding to the second image area, and
the controller is further configured to change an image filter applied to an image area corresponding to a display area to which the touch drag input is received to a third image filter that is different from the first image filter and the second image filter.

17. The terminal according to claim 16,
wherein the display is further configured to receive the touch drag input that is input on the first display area or the second display area, the touch drag input being towards a first direction that is perpendicular to a direction from the first display area towards the second display area or towards a second direction that is opposite to the first direction.

18. A terminal comprising:
an inputter configured to receive an input of a preview image converted from light reflected from surroundings of the terminal;
a controller configured to:
  identify a type of an object included in the preview image; and
  apply a first image filter to a first image area of the preview image and apply a second image filter that is different from the first image filter to a second image area that is an area excluding the first image area of the preview image, the first image filter and the second image filter being selected using a recommended algorithm regarding an image filter to be applied to the preview image; and
a display configured to display the preview image to which the first image filter and the second image filter are applied,
wherein the display is further configured to receive a touch drag input that starts from an arbitrary point on a boundary of a first display area of the display corresponding to the first image area and a second display area of the display corresponding to the second image area, and adjusts a ratio of the first image area and a ratio of the second image area based on the touch drag input, and
the controller is further configured to, based on a determination that one of the ratio of the first image area and the ratio of the second image area becomes a reference ratio or above, apply an image filter applied to an image area having the reference ratio or above to an entire area of the preview image.

* * * * *